US009141515B1

(12) United States Patent
Sonwane et al.

(10) Patent No.: US 9,141,515 B1
(45) Date of Patent: Sep. 22, 2015

(54) LIMITING DISPLAY CONTENT IN EDITOR FOR LARGE DATA VOLUMES

(71) Applicants: Tejram Jagannath Sonwane, Bangalore (IN); Joy Bhattacharjee, Bangalore (IN)

(72) Inventors: Tejram Jagannath Sonwane, Bangalore (IN); Joy Bhattacharjee, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/331,929

(22) Filed: Jul. 15, 2014

(51) Int. Cl.
*G06F 9/44* (2006.01)
*G06F 11/36* (2006.01)

(52) U.S. Cl.
CPC .................... *G06F 11/3664* (2013.01)

(58) Field of Classification Search
USPC .................................................. 717/123–129
IPC ................................ G06F 8/34,3/048
See application file for complete search history.

(56) References Cited

U.S. PATENT DOCUMENTS

| | | | |
|---|---|---|---|
| 4,723,209 A | 2/1988 | Hernandez | |
| 5,050,071 A | 9/1991 | Harris et al. | |
| 5,544,360 A | 8/1996 | Lewak et al. | |
| 5,644,692 A | 7/1997 | Eick | |
| 5,999,177 A | 12/1999 | Martinez | |
| 6,199,107 B1 | 3/2001 | Dujari | |
| 6,257,774 B1 * | 7/2001 | Stack | 717/110 |
| 6,715,139 B1 * | 3/2004 | Kodosky et al. | 717/125 |
| 6,803,930 B1 | 10/2004 | Simonson | |
| 6,889,375 B1 * | 5/2005 | Chan et al. | 717/123 |
| 6,934,934 B1 * | 8/2005 | Osborne et al. | 717/126 |
| 7,340,714 B2 * | 3/2008 | Upton | 717/102 |
| 7,464,373 B1 * | 12/2008 | Yunt et al. | 717/125 |
| 7,506,313 B2 * | 3/2009 | Bates et al. | 717/125 |
| 7,506,315 B1 * | 3/2009 | Kabadiyski et al. | 717/128 |
| 7,587,672 B2 | 9/2009 | Wolf | |
| 7,747,983 B2 * | 6/2010 | DeBruin et al. | 717/124 |
| 7,823,135 B2 * | 10/2010 | Horning et al. | 717/127 |
| 7,877,731 B2 * | 1/2011 | Bekelman | 717/123 |
| 8,286,142 B2 * | 10/2012 | Fjeldstad et al. | 717/129 |
| 8,291,261 B2 | 10/2012 | Malleck et al. | |
| 8,407,673 B2 * | 3/2013 | Terpolilli | 717/127 |
| 8,572,575 B2 * | 10/2013 | Berlyant et al. | 717/126 |
| 8,645,849 B2 | 2/2014 | Forutanpour et al. | |
| 8,667,470 B2 * | 3/2014 | Lin et al. | 717/128 |
| 8,694,967 B2 * | 4/2014 | Grieves et al. | 717/124 |
| 8,752,021 B2 * | 6/2014 | Li et al. | 717/127 |
| 8,793,657 B2 * | 7/2014 | Belisario et al. | 717/125 |
| 8,850,392 B2 * | 9/2014 | Lauff et al. | 717/123 |
| 8,966,452 B2 * | 2/2015 | Gataullin et al. | 717/128 |
| 8,990,777 B2 * | 3/2015 | Gounares | 717/125 |

(Continued)

OTHER PUBLICATIONS

Johnson et al, "Composable Multi-Level Debugging with Stackdb", ACM, pp. 213-225, 2014.*

(Continued)

*Primary Examiner* — Anil Khatri
(74) *Attorney, Agent, or Firm* — Fountainhead Law Group PC

(57) ABSTRACT

An engine is interposed between a user and an editor. The engine is configured to receive messages from the editor denying user access to large data files. In response, the engine is configured to communicate a first message to the user asking whether the user desires to open a subset of the file contents using the editor. Upon receipt of an affirmative from the user, the engine is configured to communicate a second message to the user seeking input on a size of the file subset that is to be accessed. The engine then communicates to the editor, a third message specifying a size of the subset of data that is to be provided. In response to receiving the third message, the editor produces the requested subset of the stored data corresponding to the size indicated by the user.

14 Claims, 7 Drawing Sheets

(56) References Cited

U.S. PATENT DOCUMENTS

2004/0254884 A1    12/2004  Haber et al.
2011/0145735 A1     6/2011  Driesner et al.
2012/0117481 A1     5/2012  Stevens et al.

OTHER PUBLICATIONS

Park et al, "Synthesis of Pipelined Memory Access Controllers for Streamed Data Applications on FPGA-based Computing Engines", ACM, pp. 221-226, 2001.*

Alagiannis et al, "NoDB: Efficient Query Execution on Raw Data Files", ACM, pp. 241-252, 2012.*

Shao et al, "Trinity: A Distributed Graph Engine on a Memory Cloud", ACM, pp. 505-516, 2013.*

Internet article "Text FileSize Limiting," retrieved May 1, 2014, from https://confluence atlassian.com/display/FISHEYE/Text+file+size_limiting.

* cited by examiner

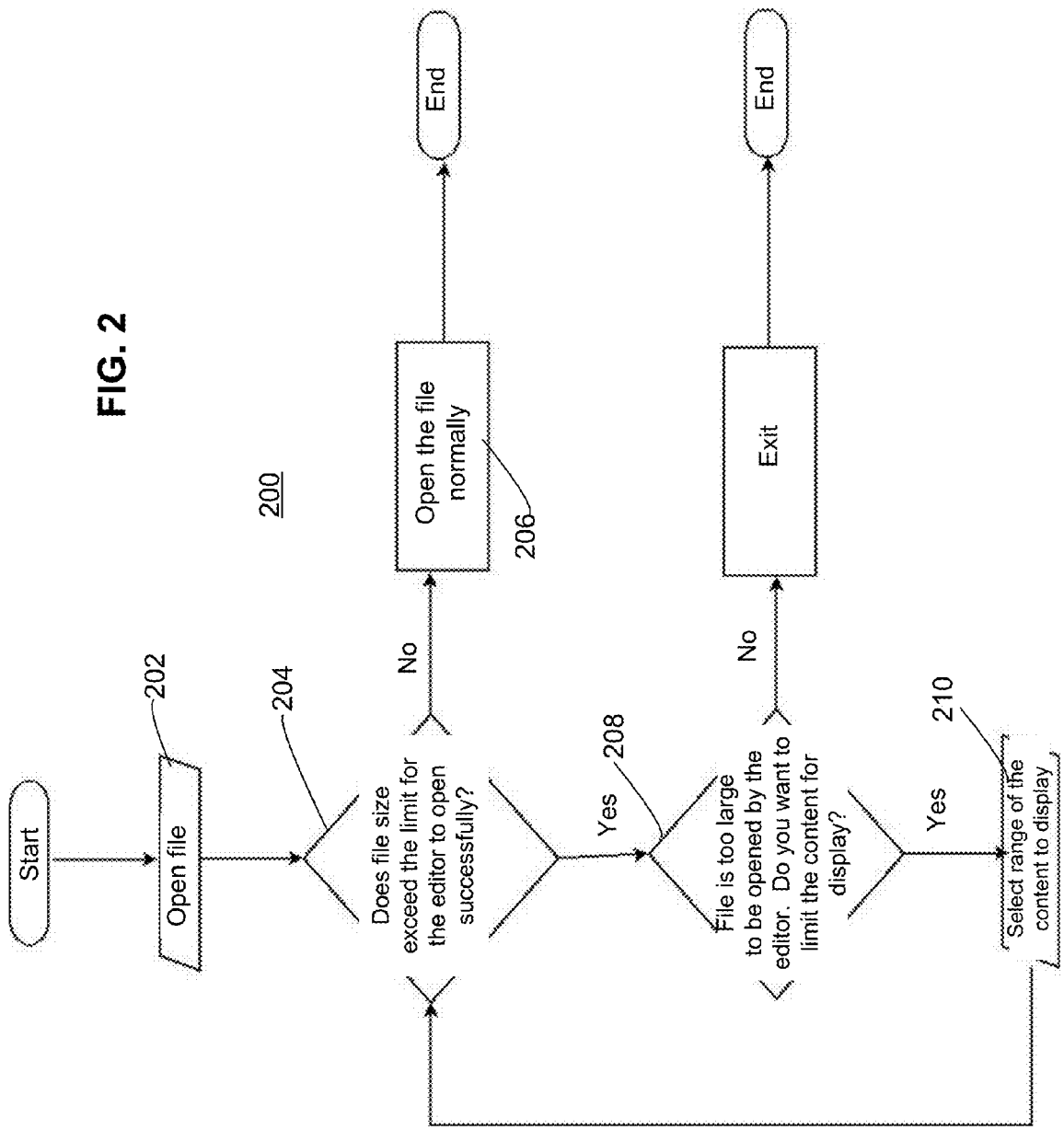

LIMITING DISPLAY CONTENT IN EDITOR FOR LARGE DATA VOLUMES

BACKGROUND

Embodiments of the present invention relate to data storage and handling, and in particular to methods and apparatuses limiting display content in an editor for large data volumes. Unless otherwise indicated herein, the approaches described in this section are not prior art to the claims in this application and are not admitted to be prior art by inclusion in this section.

With the advent of smart devices and reduced memory cost, the volumes of data that are stored and accessed in databases, are growing in size. While useful in many contexts, the availability of such "big data" can offer challenges to conventional data handling techniques.

For example, various different editors that can be utilized to open and display the content of a data file. Examples of such editors include but are not limited to those able to access delimited text files (.txt) in which the TAB character (ASCII character code 009) typically separates each field of text, and those editors able to access comma separated values text files (.csv) in which the comma character (,) typically separates each field of text.

Typically, many such editors do not support access to files containing large volumes of data. In such cases, attempting to access a file having a large volume of data, likely results in an error message indicating that the file is too big to be opened by the editor.

In many applications, however, a user does not need access to the entire, complete contents of a file. Instead, the user may be satisfied to access only to a subset of the file content. Under such circumstances, however, the user is still precluded by the editor from accessing even a limited volume of data. Instead, user access to any data remains entirely blocked by the error message.

SUMMARY

A computer system comprises an engine interposed between a user and an editor. The engine is configured to receive those messages from the editor denying user access to large data files. In response to receipt of such a message from the editor, the engine is configured to communicate a first message to the user asking whether the user desires to open a subset of the file contents using the editor. Upon receipt of an affirmative message from the user, the engine is configured to communicate a second message to the user seeking input on a size of the file subset that is to be accessed. Such file subset size may be expressed in terms of number of pages, page ranges, number of characters, % of the entire file size, or various other criteria. In certain embodiments, this second message may provide a default range to the user. The engine then communicates to the editor, a third message specifying a size of the subset of data that is to be provided. In certain embodiments, this third message may access the partial file content utilizing a data recovery functionality available to the editor. In response to receiving the third message, the editor produces the requested subset of the stored data corresponding to the size indicated by the user.

An embodiment of a computer-implemented method comprises causing an engine to receive from an editor, a decline to open a file due to a file size. In response to receiving the decline, the engine is caused to generate a first message asking whether a user desires to access a subset of the file. In response to receiving user assent to the first message, the engine is caused to generate a second message requesting user input to define a volume of the subset. In response to receiving a reply to the second message, the engine is caused to generate a third message requesting the editor to produce the volume of the subset.

A non-transitory computer readable storage medium embodies a computer program for performing a method comprising causing an engine to receive from an editor, a decline to open a file due to a file size. In response to receiving the decline, the engine is caused to generate a first message asking whether a user desires to access a subset of the file. In response to receiving user assent to the first message, the engine is caused to generate a second message requesting user input to define a volume of the subset, the second message including a default for the volume. In response to receiving a reply to the second message, the engine is caused to generate a third message requesting the editor to produce the volume of the subset.

An embodiment of a computer system comprises one or more processors and a software program, executable on said computer system. The software program is configured to cause an engine to receive from a .txt editor or a .csv editor, a decline to open a file due to a file size. In response to receiving the decline, the software program is configured to cause the engine to generate a first message asking whether a user desires to access a subset of the file. In response to receiving user assent to the first message, the software program is configured to cause the engine to generate a second message requesting user input to define a volume of the subset, the second message including a default for the volume. In response to receiving a reply to the second message, the software program is configured to cause the engine to generate a third message requesting the editor to produce the volume of the subset.

According to an embodiment the second message include a default for the volume.

In certain embodiments the default is determined by the engine to allow the subset to be opened by the editor.

In some embodiments a unit of the volume is determined based upon communication between the engine and the editor.

In various embodiments a unit of the volume comprises a page.

According to particular embodiments a unit of the volume comprises a character.

In some embodiments the third message is in a format recognized by a data retrieval functionality of the editor.

In certain embodiments the third message is in a format recognized by a data recovery functionality of the editor.

The following detailed description and accompanying drawings provide a better understanding of the nature and advantages of particular embodiments.

BRIEF DESCRIPTION OF THE DRAWINGS

FIG. 2 is a simplified flow diagram of a process according to an embodiment.

DETAILED DESCRIPTION

Described herein are techniques for limiting display content in an editor for large data volumes. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

A computer system comprises an engine interposed between a user and an editor. The engine is configured to receive those messages from the editor denying user access to large data files. In response to receipt of such a message from the editor, the engine is configured to communicate a first message to the user asking whether the user desires to open a subset of the file contents using the editor. Upon receipt of an affirmative message from the user, the engine is configured to communicate a second message to the user seeking input on a size of the file subset that is to be accessed. Such file subset size may be expressed in terms of number of pages, page ranges, number of characters, % of the entire file size, or various other criteria. In certain embodiments, this second message may provide a default range to the user. The engine then communicates to the editor, a third message specifying a size of the subset of data that is to be provided. In certain embodiments, this third message may access the partial file content utilizing a data recovery functionality available to the editor. In response to receiving the third message, the editor produces the requested subset of the stored data corresponding to the size indicated by the user.

Figure 1:
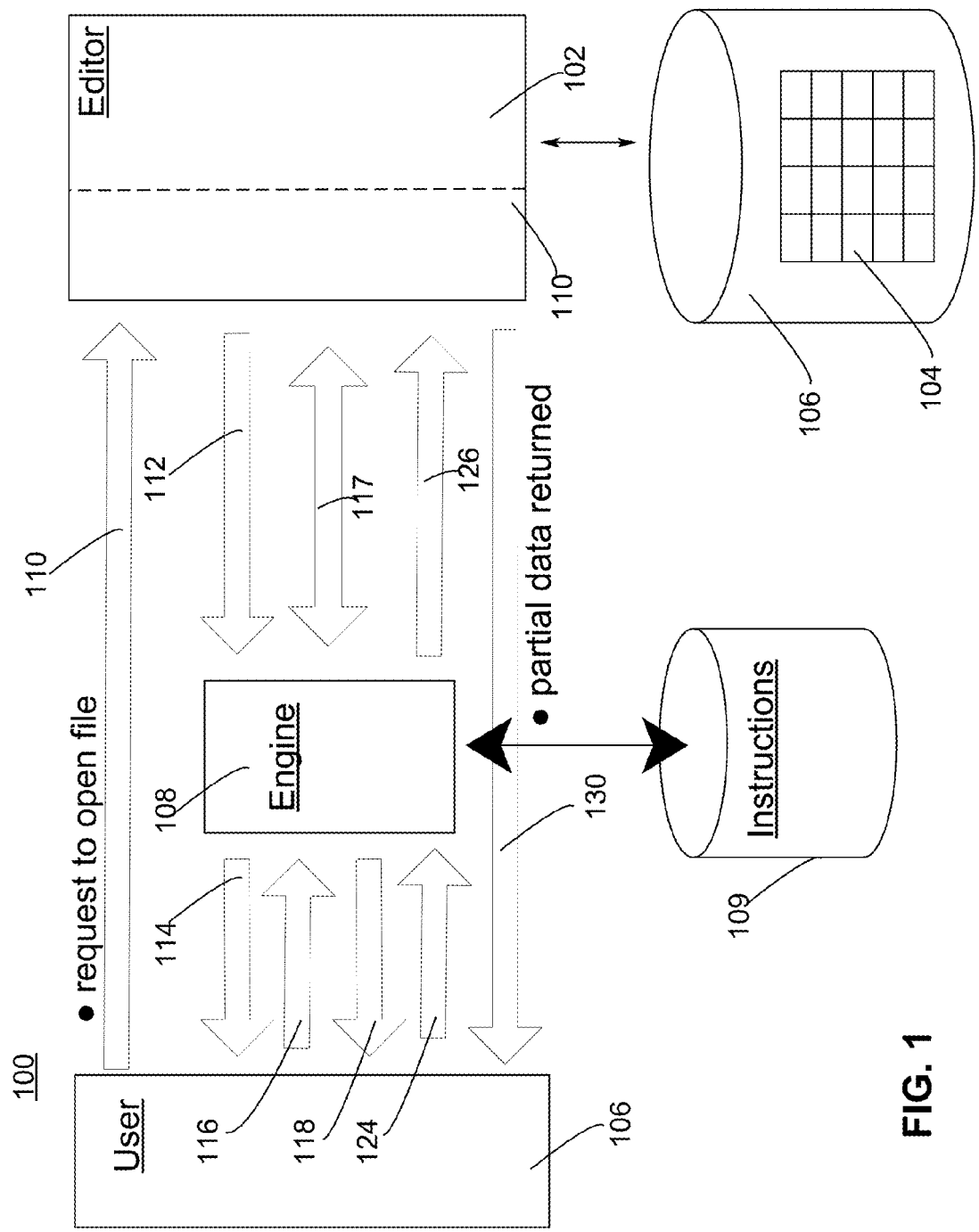
FIG. 1 shows a simplified view of a system according to an embodiment.

FIG. 1 shows a simplified view of a system according to an embodiment. System 100 comprises an editor 102 that is in communication with a file 104 stored in a non-transitory computer-readable storage medium 106. In certain embodiments, the file 104 may comprise a database.

The editor 102 further comprises an interface portion 110. The interface offers a user 112 a channel or pathway for issuing instructions to the editor in order to access the file. The interface also offers the editor a channel for returning data to the user.

Also shown in the system of FIG. 1, is an engine 108. Engine 108 is in communication with the editor and with the user.

Engine 108 is also in communication with a set of instructions 109 stored in a non-transitory computer readable storage medium. These instructions cause the engine to perform certain actions as are now described below.

Figure 4:
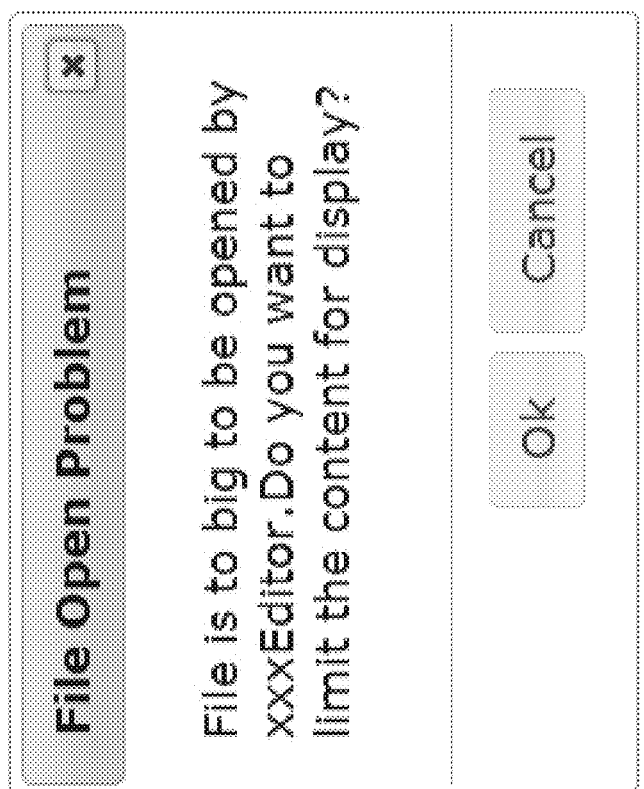
FIG. 4 shows an example of a first message sent from the engine to a user.
Figure 3:
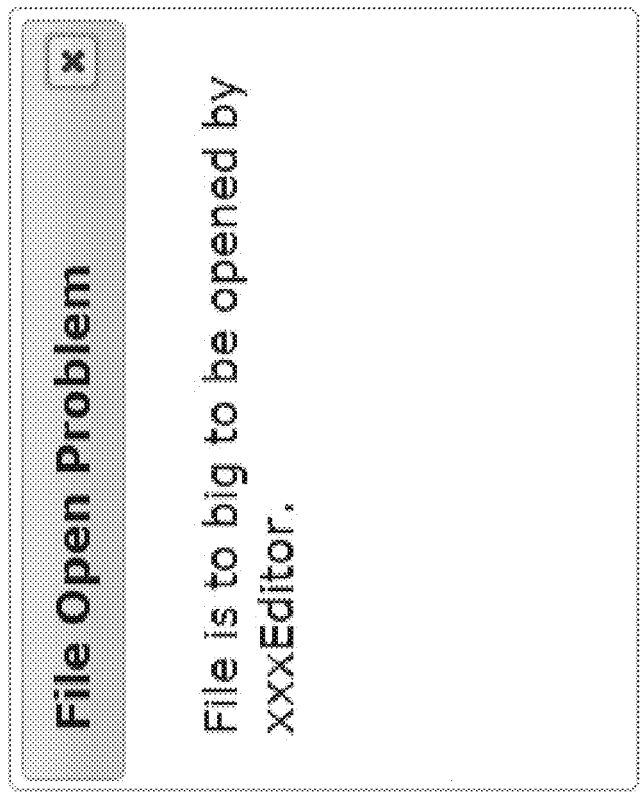
FIG. 3 shows an example of a message returned from the editor upon attempting to access a large data file.

For example, engine 108 is configured to receive certain messages communicated from the editor. That is, when a user message 110 seeks access to a file containing a large data volume, the interface may be programmed to respond with a specific message 112 indicating the file is unable to be opened by the editor owing to its size. FIG. 3 provides a simplified view of an example of such a message Engine 108 is poised to receive this message 112 as input. In response, the engine is configured to communicate to the user, a first message 114 inquiring whether the user is willing to limit the size of the displayed content in order to allow access to occur. FIG. 4 provides a simplified view of one example of this message.

If in reply message 116 the user indicates assent to the proposed limiting of content, the engine and editor may then exchange communications 117 to determine one or more factors such as the overall size of the file, the maximum size of a file portion that the editor will produce, and/or units quantifying the portion of the file to be produced.

Communications between the engine and the editor may also indicate the mechanism by which the editor may be ordered to produce only a part of the file. In particular, some editors may feature a primary data retrieval functionality that is specifically designed to produce only a subset of a file.

Other editors, however, may lack such an inherent partial data retrieval functionality. Under such circumstances the engine may instead rely upon a (secondary) data recovery functionality of the editor, in order to produce only a subset of the file. This alternative approach is discussed further below.

Figure 5:
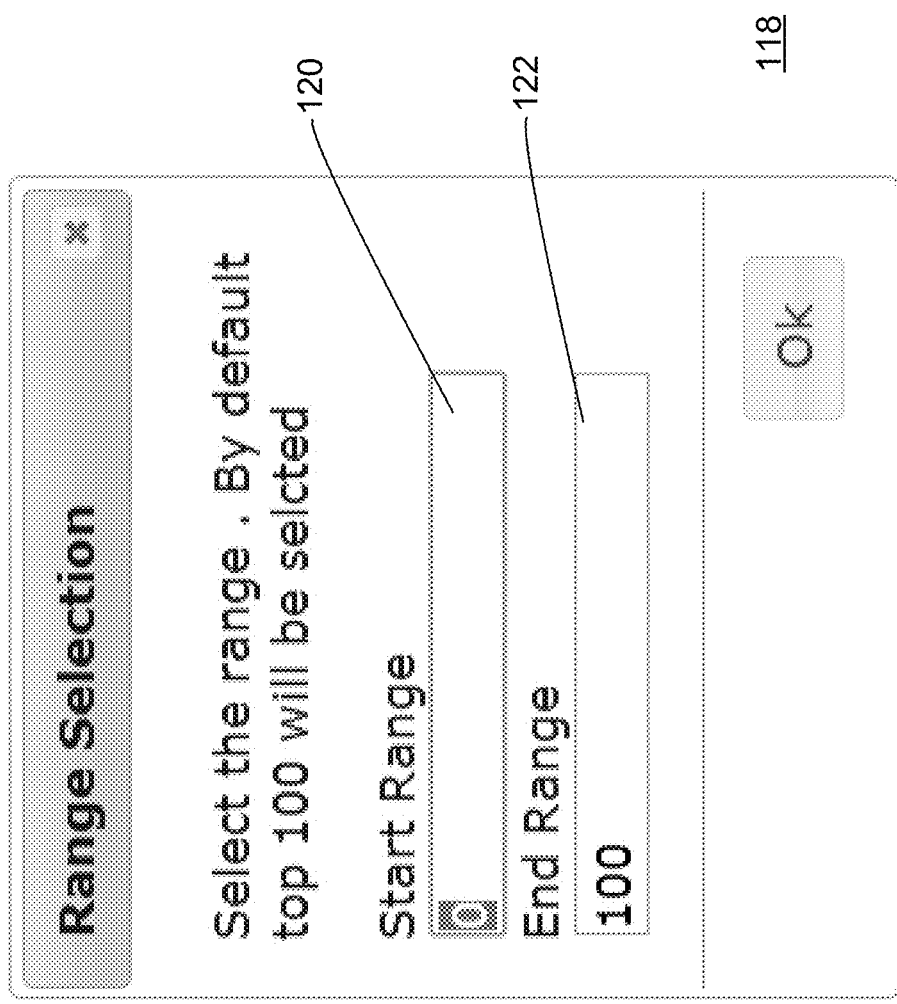
FIG. 5 shows an example of a second message sent from the engine to a user.

Upon learning this information from the editor, the engine sends a second message 118 requesting user input regarding the scope of the information that is to be retrieved. FIG. 5 provides a simplified view of this message.

In particular, the second message 118 includes a first field 120 for specifying a beginning bound of the range of data that is to be provided by the editor. The message 118 also includes a second field 122 for specifying a closing bound of the range of data that is to be provided by the editor.

According to certain embodiments such as the one shown here, the message may include a default value for the size of the subset of the file that is to be returned by the editor. In some embodiments, the size of this default value may be informed by communication between the engine and the editor, so that it will not result in another refusal to open the file.

In this particular instance the default value is the first 100 pages of the file. However, this is just an example and in alternative embodiments other default values may be specified.

Returning to FIG. 1, the user then provides to the engine 102, a response 124 to the message 118. This response includes the information regarding the size of the subset of the data that is to be provided by the editor.

Then, the engine sends to the editor, a third message 126 requesting the editor to produce only the subset of the file that was specified by the user. In certain embodiments, this message 126 may be structured for recognition by functionality of the editor designed to receive requests to producing only a subset of an existing file.

Thus, the editor may be designed to open less than the entire file. Accordingly, FIG. 1 shows the editor returning to the user, a portion 130 of the file according to the specified range. The user can now access this partial file information.

A specific example is now provided in connection with the HANA STUDIO available from SAP AG of Walldorf, Germany. The HANA STUDIO is an Eclipse-based, integrated development environment (IDE) that is used to develop artifacts in a HANA server. Here, HANA refers to an in-memory database available from SAP AG.

The HANA Studio allows technical users to manage the SAP HANA database, to create and manage user authorizations, to create new or modify existing models of data etc. The SAP HANA STUDIO also includes an editor that is used to manage the data files.

When user tries to open a big data file in SAP HANA STUDIO, a message may be returned indicating: 'JAVA heap space error'. At this point, the user is not able to access any portion of the big data file.

However, through action of an intervening engine as has been described above, the user may communicate details regarding a subset of data that is to be produced by the SAP HANA STUDIO. In response to a user message specifying a size of a subset of the file, the SAP HANA STUDIO may produce a portion of the large database file for the user's review.

In connection with this particular example, it is noted that the editor interface for the SAP HANA STUDIO is specifically designed to receive instructions to retrieve only a subset of the data file. However, certain editors may not feature this inherent functionality to retrieve only a portion of a file.

Accordingly, in certain embodiments the engine may be specifically configured to communicate a message to the editor that leverages upon some other existing functionality in order to allow production of the data subset by the editor. One example of such alternative functionality in the editor, may comprise a data recovery mechanism.

Specifically, an unexpected system failure or other contingency event can lead to corruption of information in a file. In order to avoid the complete loss of the stored information, the editor may be designed to permit partial access to uncorrupted data in order to allow reconstruction of the file. Thus according to certain embodiments, the engine is specifically designed to create a message in a format that is recognized by an existing data recovery functionality offered by the editor.

Based upon its interaction with the editor, the engine may designate the units by which the size of the subset of the file that is to be produced, may be measured. In certain embodiments, the size of the subset of the file may be measured in units of pages. As shown in the embodiment of the example, the user may be presented with the option to select page ranges of the data file for display. Such page ranges can, but need not, start at the beginning of the file.

While the above example has featured granting of partial file access quantified in terms of pages, this is not required. In alternative embodiments, the size of the partial subset of the file may be quantified in units other than pages. One example of such a unit could be a number of characters.

According to still other embodiments, the size of the subset of the file to be produced by the editor, may be quantified in relative terms according to the overall size of the file. Thus, a user could indicate that he or she wishes to access some specific percentage of the overall file. In certain embodiments where the percentage need not commence from the beginning of the file, this percentage could be specified in terms of a visual affordance of adjustable length within a larger area (e.g., a tab within a slider).

As mentioned above, in particular embodiments the file containing the large volume of data may comprise a database. This database may be a conventional disk-type database.

Alternatively, the database may have an in-memory database architecture that stores the data file in a Random Access Memory (RAM). One such an in-memory data is the HANA database available from SAP AG of Walldorf, Germany. Other examples of in-memory databases include the SYBASE IQ database also available from SAP AG; the Microsoft Embedded SQL for C (ESQL/C) database available from Microsoft Corp. of Redmond, Wash.; and the EXALYTICS In-Memory database available from Oracle Corp. of Redwood Shores, Calif.

FIG. 2 is a simplified flow diagram showing a process 200 according to an embodiment. In a first step 202 a file is opened by an editor.

In a second step 204 the editor will check if file is too large to open. If the file is not too large to open, then it will open the file normally in step 206.

If the file is too large to open, then in step 208 the editor will show the message like 'file is too big to open by editor' and provide an option to user to display the limited content of a file.

In step 210, the engine provides an option to specify the range for display the content of file. In some embodiments a default range can be supplied in case the user does not provide any range.

If the specified range is still large to be displayed, then the procedure returns to the previous step 204. If the specified range is within the permissible range, then in step 206 the editor will display the limited file content.

Figure 2A:
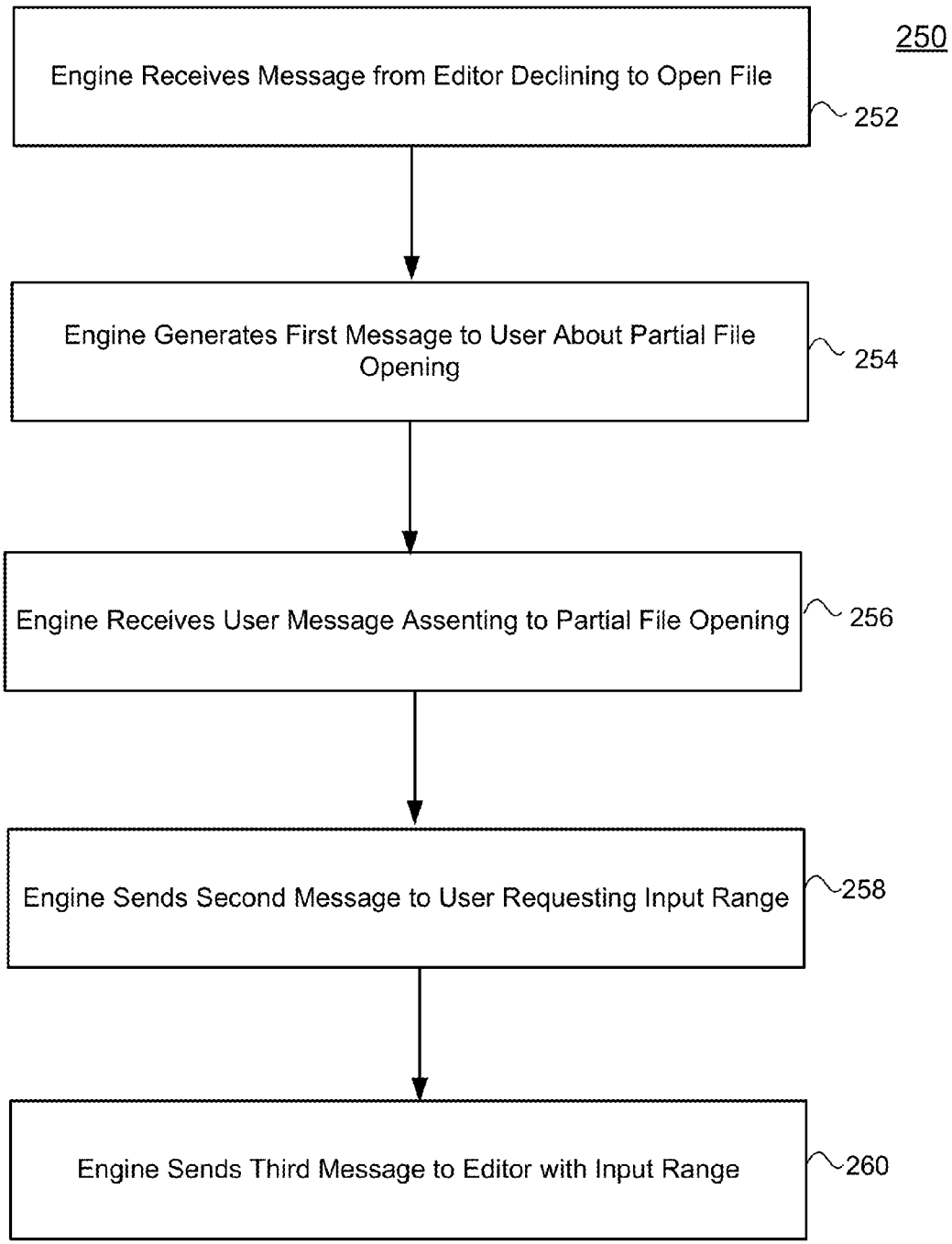
FIG. 2A is a simplified flow diagram illustrating the role of the engine in displaying a partial file content.

FIG. 2A is a simplified flow diagram illustrating the role of the engine in a process 250 of displaying a partial content of a file by an editor. In a first step 252, the engine receives from the editor, a message indicating the editor is declining to open a file due to the large volume of data within the file.

In a second step 254, the engine generates and sends a first message inquiring whether the user is interested in accessing a subset of the file volume. In a third step 256, the engine receives a message from the user assenting to partial file access.

In a fourth step 258, the engine sends a second message to the user requesting input in the form of a range of defining the file subset. As mentioned previously, in certain embodiments this second message may include a default range.

Upon receiving a user reply to the second message, in a fifth step 260 the engine sends a third message to the editor including the input range. As mentioned previously, this third message may be in a format recognized by the (primary) editor data retrieval functionality, or may be in a format recognized by a (secondary) editor data recovery functionality.

Upon receiving the third message from the engine, the editor communicates the partial data from the file corresponding to the user's input range.

Figure 6:
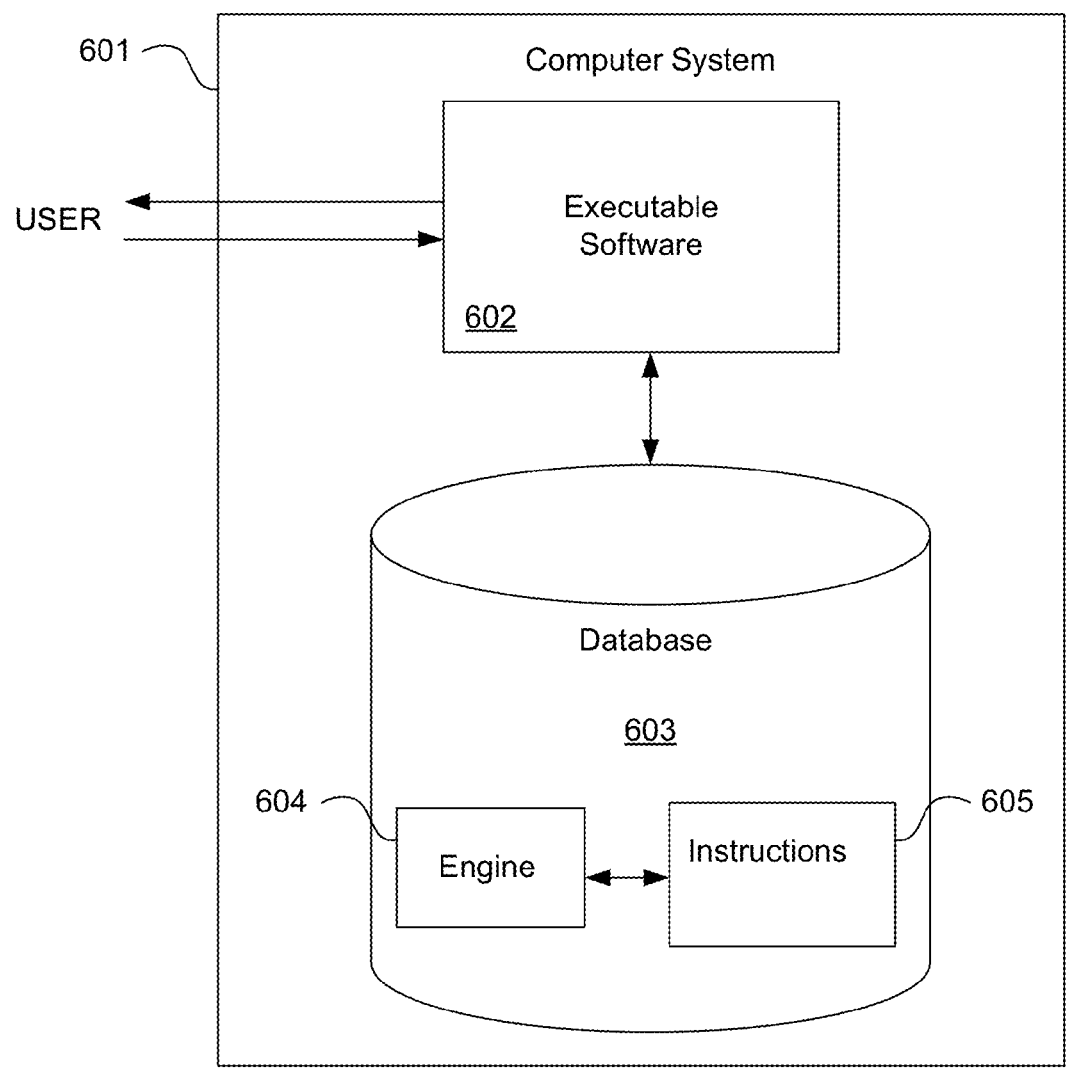
FIG. 6 illustrates hardware of a special purpose computing machine configured to allow partial data access according to an embodiment.

FIG. 6 illustrates hardware of a special purpose computing machine configured to allow partial file access according to an embodiment. In particular, computer system 601 comprises a processor 602 that is in electronic communication with a non-transitory computer-readable storage medium 603. This computer-readable storage medium has stored thereon code 605 corresponding to instructions. Code 604 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 7:
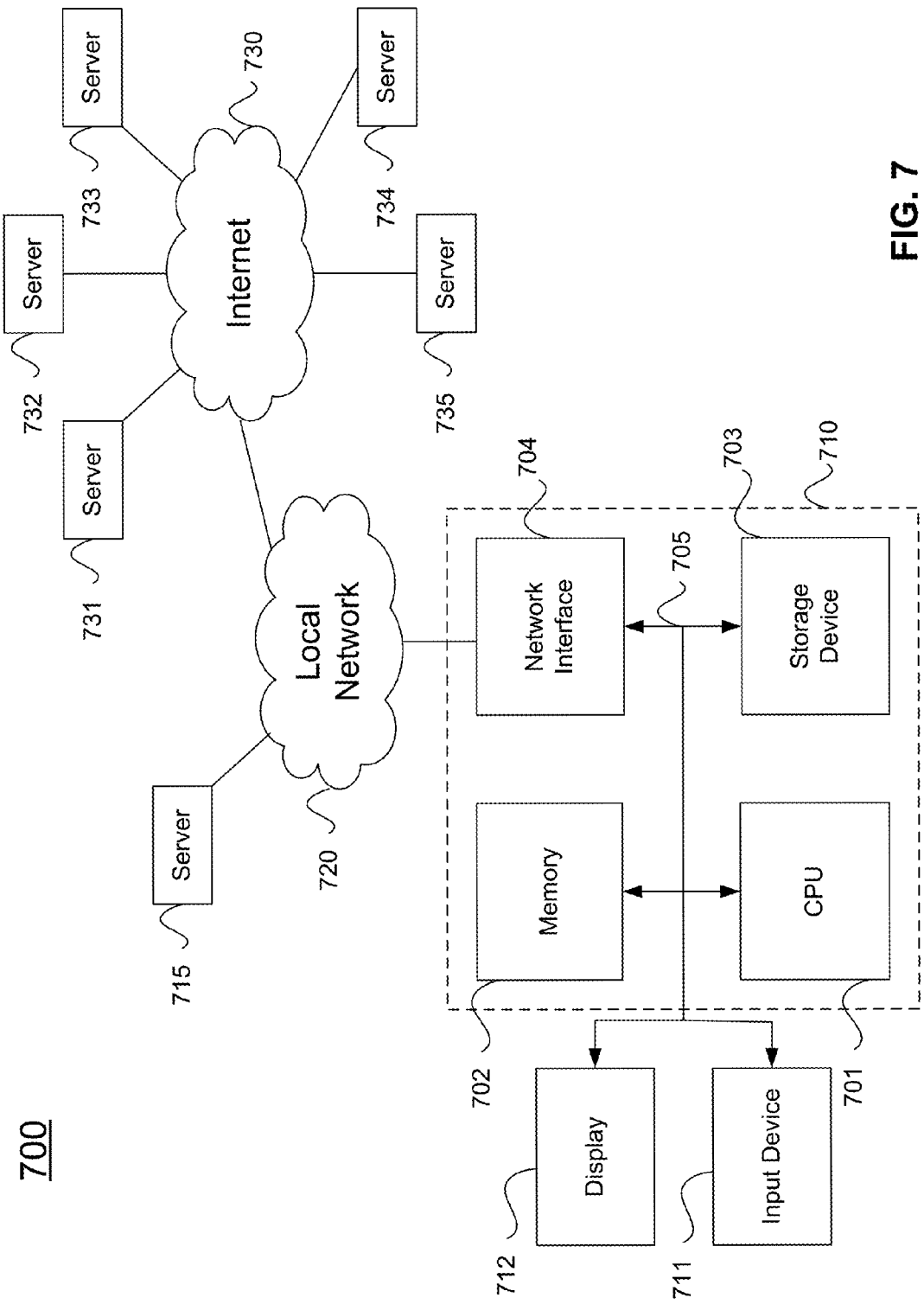
FIG. 7 illustrates an example of a computer system.

An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 804 coupled with bus 805. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    an engine receiving from an editor, a decline to open a file due to a file size;
    the engine processing the decline to generate a first message asking whether a user desires to access a subset of the file;
    the engine storing the first message in a non-transitory computer readable storage medium;
    the engine processing a user assent to the first message to generate a second message requesting user input to define a volume of the subset;
    the engine storing second message in the non-transitory computer readable storage medium;
    the engine processing a reply to the second message to generate a third message requesting the editor to produce the volume of the subset, wherein the third message is in a format recognized by a data retrieval functionality of the editor;
    the engine storing the third message in the non-transitory computer readable storage medium; and
    the engine sending the third message to cause the editor to return the volume of the subset to the user for display.

2. A method as in claim 1 wherein the second messages include a default for the volume.

3. A method as in claim 2 wherein the default is determined by the engine to allow the subset to be opened by the editor.

4. A method as in claim 1 wherein a unit of the volume is determined based upon communication between the engine and the editor.

5. A method as in claim 1 wherein a unit of the volume comprises a page.

6. A method as in claim 1 wherein a unit of the volume comprises a character.

7. A non-transitory computer readable storage medium embodying a computer program for performing a method comprising:
    an engine receiving from an editor, a decline to open a file due to a file size;
    the engine processing the decline to generate a first message asking whether a user desires to access a subset of the file;
    the engine storing the first message in a non-transitory computer readable storage medium;
    the engine processing a user assent to the first message to generate a second message requesting user input to define a volume of the subset, the second message including a default for the volume;
    the engine storing the second message in the non-transitory computer readable storage medium;
    the engine processing a reply to the second message to generate a third message requesting the editor to produce the volume of the subset, wherein the third message is in a format recognized by a data retrieval functionality of the editor;
    the engine storing the third message in the non-transitory computer readable storage medium; and
    the engine sending the third message to cause the editor to return the volume of the subset to the user for display.

8. A non-transitory computer readable storage medium as in claim 7 wherein the default is determined by the engine to allow the subset to be opened by the editor.

9. A non-transitory computer readable storage medium as in claim 7 wherein a unit of the volume is determined based upon communication between the engine and the editor.

10. A non-transitory computer readable storage medium as in claim 7 wherein a unit of the volume comprises a page.

11. A computer system comprising:
one or more processors;
a software program, executable on said computer system, the software program configured to:
an engine receiving from a .txt editor or a .csv editor, a decline to open a file due to a file size;
the engine processing the decline to generate a first message asking whether a user desires to access a subset of the file;
store the first message in a non-transitory computer readable storage medium; and
processing a user assent to the first message to generate a second message requesting user input to define a volume of the subset, the second message including a default for the volume;
store the second message in the non-transitory computer readable storage medium;
process a reply to the second message to generate a third message requesting the editor to produce the volume of the subset, wherein the third message is in a format recognized by a data retrieval functionality of the editor;
store the third message in the non-transitory computer readable storage medium; and
send the third message to cause the editor to return the volume of the subset to the user for display.

12. A computer system as in claim 11 wherein the default is determined by the engine to allow the subset to be opened by the editor.

13. A computer system as in claim 11 wherein a unit of the volume is determined based upon communication between the engine and the editor.

14. A computer system as in claim 11 wherein a unit of the volume comprises pages, characters, or a relative portion of the file size.

* * * * *